United States Patent
Kim et al.

(10) Patent No.: US 9,258,548 B2
(45) Date of Patent: Feb. 9, 2016

(54) APPARATUS AND METHOD FOR GENERATING DEPTH IMAGE

(75) Inventors: Sung Cheol Kim, Goyang-si (KR); Hwa Sup Lim, Hwaseong-si (KR); Kassou Ahmad Ramez, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 593 days.

(21) Appl. No.: 13/067,390

(22) Filed: May 27, 2011

(65) Prior Publication Data

US 2012/0162370 A1 Jun. 28, 2012

(30) Foreign Application Priority Data

Dec. 27, 2010 (KR) .................. 10-2010-0135758

(51) Int. Cl.
| | |
|---|---|
| H04N 13/00 | (2006.01) |
| H04N 13/02 | (2006.01) |
| G01B 11/02 | (2006.01) |
| G01B 11/24 | (2006.01) |
| G01S 17/08 | (2006.01) |
| G01S 17/89 | (2006.01) |

(52) U.S. Cl.
CPC ............ *H04N 13/0253* (2013.01); *G01B 11/02* (2013.01); *G01B 11/24* (2013.01); *G01S 17/08* (2013.01); *G01S 17/89* (2013.01)

(58) Field of Classification Search
CPC ........ G01B 11/02; G01B 11/24; G01S 17/08; G01S 17/89; H04N 13/0253
USPC ....................................... 348/42, 46
See application file for complete search history.

(56) References Cited

U.S. PATENT DOCUMENTS

| | | | | |
|---|---|---|---|---|
| 6,597,398 | B1 * | 7/2003 | Booth, Jr. ......... | H01L 27/14609 257/E27.132 |
| 7,375,803 | B1 * | 5/2008 | Bamji ................ | G01S 7/4816 356/4.01 |

(Continued)

FOREIGN PATENT DOCUMENTS

| | | |
|---|---|---|
| JP | 08-043203 | 2/1996 |
| KR | 10-2009-0050567 | 5/2009 |

(Continued)

OTHER PUBLICATIONS

ATSM International, "Standard Tables for Reference Solar Spectral Irradiances: Direct Normal and Hemispherical on 37 degree Tilted Surface," Designation: G173-03 (Reapproved 2008), Table 2, p. 10 (hereinafter NPL1).*

*Primary Examiner* — Jessica M Prince
(74) *Attorney, Agent, or Firm* — Harness, Dickey & Pierce, P.L.C.

(57) ABSTRACT

Provided is a depth image generating apparatus. The depth image generating apparatus may include a filtering unit, a modulation unit, and a sensing unit. The filtering unit may band pass filter an infrared light of a first wavelength band among infrared lights received from an object. The modulation unit may modulate the infrared light of the first wavelength band to an infrared light of a second wavelength band. The sensing unit may generate an electrical signal by sensing the modulated infrared light of the second wavelength band.

9 Claims, 5 Drawing Sheets

(56) References Cited

U.S. PATENT DOCUMENTS

| | | | |
|---|---|---|---|
| 2003/0147002 A1* | 8/2003 | Ray | G01S 17/89 348/370 |
| 2007/0189583 A1* | 8/2007 | Shimada | G06K 9/2018 382/118 |
| 2007/0247517 A1* | 10/2007 | Zhang | G06K 9/2018 348/30 |
| 2009/0050807 A1* | 2/2009 | Ota | H04N 5/2354 250/338.1 |
| 2009/0054788 A1* | 2/2009 | Hauger | A61B 5/0059 600/476 |
| 2009/0115877 A1* | 5/2009 | Verdant | H04N 5/33 348/302 |
| 2011/0018020 A1 | 1/2011 | Jagt | |

FOREIGN PATENT DOCUMENTS

| | | |
|---|---|---|
| KR | 10-2010-0050024 | 5/2010 |
| KR | 10-2010-0059361 | 6/2010 |
| KR | 10-2010-0087819 | 8/2010 |
| KR | 10-2010-0093570 | 8/2010 |

* cited by examiner

400

APPARATUS AND METHOD FOR GENERATING DEPTH IMAGE

CROSS-REFERENCE TO RELATED APPLICATIONS

This application claims the priority benefit of Korean Patent Application No. 10-2010-0135758, filed on Dec. 27, 2010, in the Korean Intellectual Property Office, the disclosure of which is incorporated herein by reference.

BACKGROUND

1. Field

Embodiments relate to a method and apparatus for generating a depth image, and more particularly, to a method and apparatus that may acquire a depth image using an infrared light.

2. Description of the Related Art

Currently, interest on a three-dimensional (3D) image is increasing. A method of obtaining 3D spatial information of an object may include a method of scanning the object using a laser, a method of photographing a depth image using an infrared light, and the like.

A method of generating a depth image using an infrared light may employ a time of flight (TOF) scheme, a coded light triangulation scheme, and the like.

The TOF scheme may obtain depth information that is a distance between an object and a depth camera using a phase difference between an emitted infrared light and an infrared light reflected and returned from the object.

The coded light triangulation scheme may obtain depth information by triangulating a path between a pattern of the emitted infrared light and a pattern of the infrared light reflected and returned from the object.

In general, the above TOF scheme and the coded light triangulation scheme may use an infrared light having a wavelength band of 800 nm to 900 nm since a commercialized silicon based image sensor senses an infrared light of 400 nm to 1100 nm. Also, an infrared light having a wavelength band less than or equal to 800 n may be perceived by eyes of a human being, and a sensitivity of a sensor may be deteriorated with respect to an infrared light having a wavelength band greater than 900 nm.

The infrared light having the wavelength band of 800 nm to 900 nm generally exists in an outdoor sunlight environment. Accordingly, when the depth camera uses the infrared light having the above wavelength band, the depth camera may have difficulty in acquiring a depth image.

SUMMARY

According to an aspect of one or more embodiments, there is provided an apparatus for generating a depth image, including: a filtering unit to band pass filter an infrared light of a first wavelength band among infrared lights received from an object; a modulation unit to modulate the infrared light of the first wavelength band to an infrared light of a second wavelength band; and a sensing unit to generate an electrical signal by sensing the modulated infrared light of the second wavelength band.

The apparatus may further include a light emitting unit to emit the infrared light of the first wavelength band towards the object.

The apparatus may further include a processing unit to generate a depth image corresponding to the object using the electrical signal.

The first wavelength band may correspond to a wavelength band having an infrared intensity less than or equal to a first threshold on the surface of the earth in a sunlight environment.

The first wavelength band may correspond to a wavelength band including 1300 nm and having a bandwidth less than or equal to a second threshold.

The sensing unit may correspond to a silicon based infrared sensor. The second wavelength band may correspond to a wavelength band in which an efficiency of the sensing unit is greater than or equal to a third threshold.

The second wavelength band may correspond to a wavelength band including 800 nm and having a bandwidth less than or equal to a fourth threshold.

According to an aspect of one or more embodiments, there is provided a method of generating a depth image, including: band pass filtering, by a filtering unit of a depth image generating apparatus, an infrared light of a first wavelength band among infrared lights received from an object; modulating, by a modulation unit of the depth image generating apparatus, the infrared light of the first wavelength band to an infrared light of a second wavelength band; and generating, by a sensing unit of the depth image generating apparatus, an electrical signal by sensing the modulated infrared light of the second wavelength band.

According to one or more embodiments, it is possible to generate an accurate depth image in both an indoor environment and an outdoor sunlight environment.

According to one or more embodiments, since an existing silicon based image sensor may be used as is, it is possible to generate an accurate depth image without using a separate sensor for photographing the accurate depth image in an outdoor sunlight environment.

According to an aspect of one or more embodiments, there is provided a method of generating a depth image, including: band pass filtering an infrared light of a first wavelength band among infrared lights received from an object; modulating the infrared light of the first wavelength band to an infrared light of a second wavelength band; generating an electrical signal by sensing the modulated infrared light of the second wavelength band; and generating, using at least one processor, a depth image corresponding to the object using the electrical signal.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
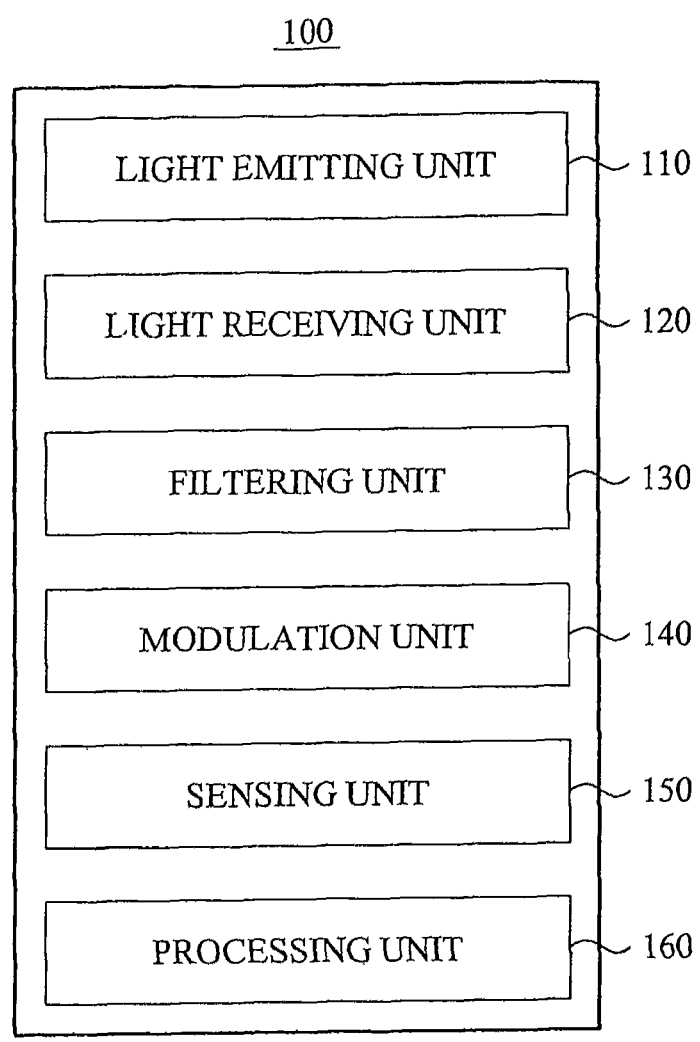
FIG. 1 illustrates a depth image generating apparatus according to one or more embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a depth image generating apparatus 100 according to one or more embodiments.

Referring to FIG. 1, the depth image generating apparatus 100 may include a light emitting unit 110 (e.g. light emitter), a light receiving unit 120, a filtering unit 130 (e.g. filter), a modulation unit 140 (e.g. modulator), a sensing unit 150 (e.g. sensor), and a processing unit 160. The processing unit 160 may have one or more processors.

The light emitting unit 110 may emit an infrared light of a first wavelength band towards an object of which a depth image is desired to be generated.

In this example, the first wavelength band may correspond to a wavelength band having an infrared intensity, observed from the surface of the earth in a sunlight environment, being less than or equal to a first threshold. The first threshold may not be fixed to a predetermined value and thus, may be selectively set to a different value, for example, 0.01 W/m$^2$/nm. As described above, the first threshold is not limited to the present embodiment and thus, may be set to have a different value, for example, 0.005 W/m$^2$/nm and the like.

A sunlight spectrum is known to have a different intensity for each wavelength. Since a sunlight radiation is reflected or absorbed by the air, vapor, cloud, dust, and the like in an atmosphere, the sunlight spectrum measured on the surface of the earth may also have a different intensity for each wavelength. The sunlight spectrum will be further described with reference to FIG. 2.

Since the intensity of the sunlight spectrum observed on the surface of the earth becomes significantly small, a zero wavelength band or a few of wavelength bands being close to 'zero' may exist, for example, around 1300 nm, around 1800 nm, and around 2700 nm to 2800 nm.

According to embodiments, a first wavelength band of an infrared light emitted by the light emitting unit 110 may correspond to a wavelength band around 1300 nm.

In general, a depth camera using an infrared light may employ a silicon based complementary metal oxide semiconductor (CMOS) sensor. The silicon based CMOS sensor may have a relatively good efficiency in a bandwidth of 800 nm to 900 nm and thus, may use an infrared light of the same wavelength band as above.

The infrared light having the wavelength band of 800 nm to 900 nm may be generally observed in an outdoor sunlight environment. Accordingly, it may be difficult to receive a light by sorting only an infrared light emitted from the depth camera. That is, when the general depth camera is employed in the outdoor sunlight environment, it may be difficult to generate a depth image having a relatively good quality.

According to embodiments, the light emitting unit 110 may emit, towards the object, an infrared light of a wavelength band including the artificially generated first wavelength band, for example, 1300 nm, and having a bandwidth less than or equal to a second threshold, for example, 10 nm.

The infrared light of the first wavelength may not be naturally observed on the surface of the earth, and thus, only the infrared light of the first wavelength band may be filtered among lights received by the light receiving unit 120. The filtered infrared light may be determined as a light that is emitted from the light emitting unit 110 and is reflected and thereby returned from the object.

The filtering unit 130 may band pass filter the light received by the light receiving unit 120 and then transfer only the infrared light of the first wavelength band to the modulation unit 140.

The modulation unit 140 may modulate the infrared light of the first wavelength band to an infrared light of a second wavelength band in which a sensing efficiency of the sensing unit 150 is relatively good.

For example, the sensing unit 150 may be a CMOS sensor including a silicon based photodiode that is used for the general depth camera.

The CMOS sensor is known to have the most excellent efficiency in a bandwidth of 800 nm to 900 nm.

The second wavelength band may be defined as a wavelength band in which the sensing efficiency of the sensing unit 150 is greater than or equal to a third threshold. The third threshold may be a reference value on a specification that guarantees a normal operation of a commercial CMOS sensor including a general silicon based photodiode. It may be easily understood by those skilled in the art that the third threshold is an efficiency value that is a reference value to guarantee that an infrared sensor normally operates.

The second wavelength band modulated and thereby generated from the infrared light of the first wavelength band by the modulation unit 140 may correspond to a wavelength band including 800 nm and having a bandwidth less than or equal to a fourth threshold, for example, 10 nm.

Accordingly, instead of using a separate expensive sensor for sensing the first wavelength, for example, 1300 nm, the commercial infrared sensor may be employed as is for the configuration of the sensing unit 150.

When the sensing unit 150 generates an electrical signal for each pixel within the sensing unit 150 using the infrared light of the second wavelength band, the processing unit 160 may generate a depth image corresponding to the object using electrical signals of pixels.

A process of the processing unit 150 generating the depth image may be the same as a process of the conventional depth camera.

According to embodiments, unlike the general depth camera, the depth image generating apparatus 100 may include the filtering unit 130 to band pass filter the infrared light of the first wavelength band, for example, 1300 nm and the modulation unit 140 to modulate the infrared light of the first wavelength band to the infrared light of the second wavelength band. Therefore, conventional infrared-based depth cameras using a wavelength band of 800 nm to 900 nm may be employed in the outdoor sunlight environment.

According to embodiments, instead of using a separate sensor for sensing an infrared light having a wavelength band of 1300 nm, a conventional infrared sensor may be employed as is. Therefore, it is possible to apply an existing silicon based infrared sensor process.

Hereinafter, an operation of the depth image generating apparatus 100 will be further described with reference to FIG. 2 through FIG. 4.

Figure 2:
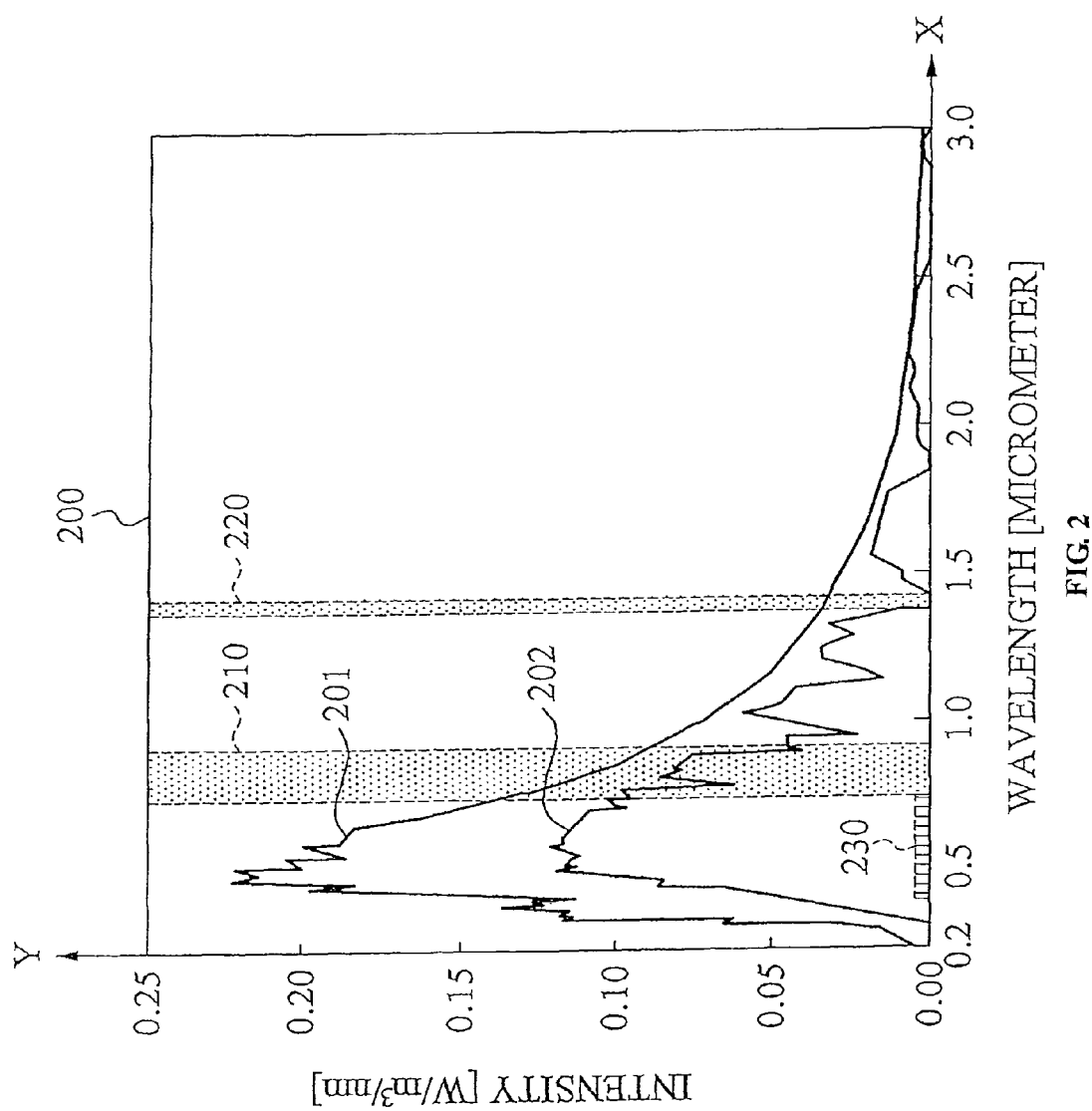
FIG. 2 illustrates an infrared light of a wavelength band used by the depth image generating apparatus of FIG. 1 according to one or more embodiments.

FIG. 2 illustrates an infrared light of a wavelength band used by the depth image generating apparatus 100 of FIG. 1 according to one or more embodiments.

Referring to a graph 200 of FIG. 2, an X axis corresponds to a wavelength and a unit of the X axis is micrometer. An Y axis corresponds to an intensity of solar radiation and a unit of the Y axis is W/m$^3$/nm.

A wavelength band 230 may correspond to a visible light band.

A curved line 201 may correspond to a sunlight spectrum observed from an outside of an atmosphere, and a curved line 202 may correspond to a sunlight spectrum observed on the surface of the earth.

As shown in the curved line 202, in the sunlight observed on the surface of the earth, most infrared lights of a wavelength band around 1300 nm may be absorbed or reflected in the atmosphere, thereby failing to reach the surface of the earth.

The above wavelength band may be defined herein as a first wavelength band 220. As described above, the first wavelength band 220 is not limited to the wavelength band around 1300 nm and thus, may include another band having a solar energy intensity on the surface of the earth being near to zero, for example, less than or equal to a second threshold.

In a conventional art, a depth camera may generate a depth image using an infrared light of a wavelength band 210 of 800 nm to 900 nm. The infrared light of the wavelength band 210 may be generally observed in nature in addition to the infrared light emitted from the depth camera. Accordingly, a precision of the depth image may be deteriorated, or the depth image may not be generated.

According to embodiments, the light emitting unit 110 may emit a light having a wavelength band around 1300 nm, the filtering unit 130 may band pass filter the light received by the light receiving unit 120, and the modulation unit 140 may modulate the light of 1300 nm to a light of around 800 nm, whereby the light may be used. Accordingly, while using an existing infrared sensor, it is possible to generate a depth image without being affected by the sunlight in an outdoor sunlight environment.

Figure 3:
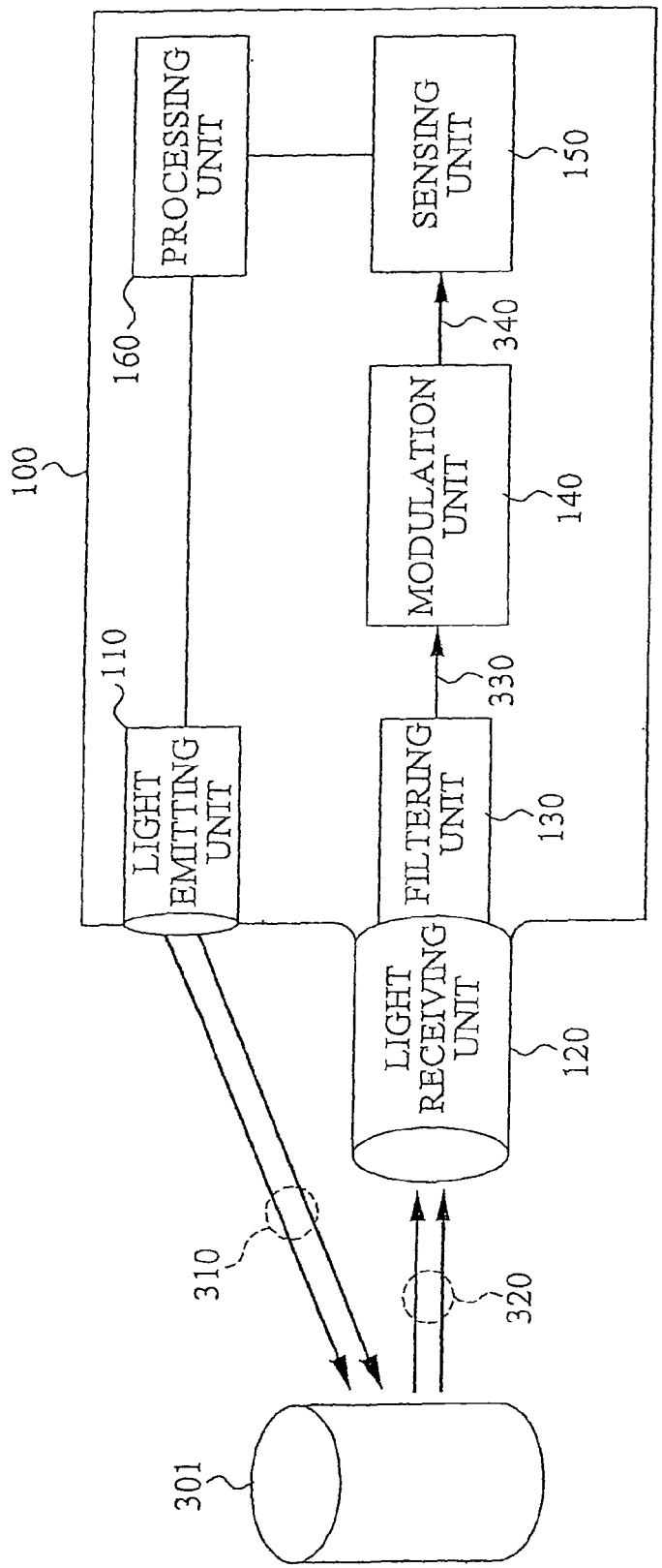
FIG. 3 illustrates a process of generating, by the depth image generating apparatus of FIG. 1, a depth image according to one or more embodiments.

FIG. 3 illustrates a process of generating, by the depth image generating apparatus 100 of FIG. 1, a depth image according to one or more embodiments.

The light emitting unit 110 may emit, towards an object 301, an infrared light 310 of a first wavelength, for example, 1300 nm. Here, the first wavelength may have an intensity of the sunlight reaching the surface of the earth being close to zero.

When the depth image generating apparatus 100 employs a time of flight (TOF) scheme, the depth image generating apparatus 100 may emit a light of a wavelength having the same period as a sine wave. When the depth image generating apparatus 100 employs a coded light triangulation scheme, the light image generating apparatus 100 may emit a light of a predetermined pattern.

A light 320 reflected from the object 301 may be received by the light receiving unit 120, for example, a lens.

In this example, a light passing the light receiving unit 120 to reach the filtering unit 130 may correspond to a light of all the bands including an infrared light of 1300 nm emitted from the light emitting unit 110 and the sunlight.

The filtering unit 130 may band pass filter the light of all the bands and transfer only an infrared light 330 of 1300 nm to the modulation unit 140.

The modulation unit 140 may modulate the filtered infrared light 330 of 1300 nm to an infrared light 340 of 800 nm in which a sensitivity of the silicon-based infrared sensing unit is relatively excellent.

The sensing unit 150 may be, for example, a CMOS sensor including an existing silicon based photodiode. The infrared light 340 of 800 nm entering each pixel of the sensing unit 150 may be converted to an electrical signal in a corresponding pixel.

In this example, when the depth image generating apparatus 100 employs the TOF scheme, the processing unit 160 may generate the depth image using a phase difference between the emitted light 310 and the received light 330. When the light image generating apparatus 100 employs the coded light triangulation scheme, the light image generating apparatus 100 may measure a distance using a path of light.

Figure 4:
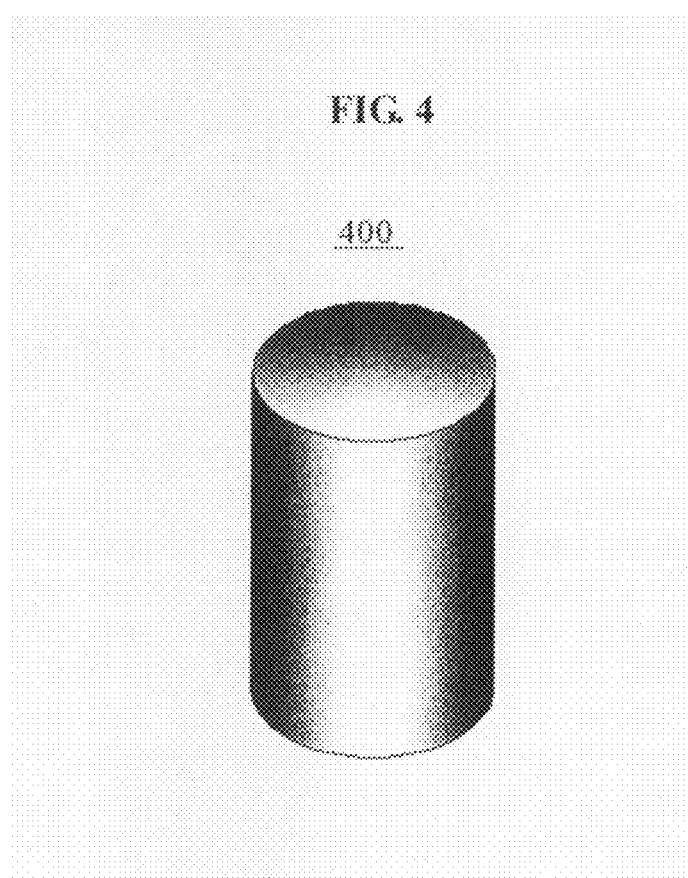
FIG. 4 illustrates an exemplary depth image generated according to one or more embodiments.

FIG. 4 illustrates an exemplary depth image 400 generated according to one or more embodiments.

A conventional depth camera may have a difficulty in generating a depth image in an outdoor sunlight environment, whereas the one or more embodiments may precisely generate the depth image 400.

Figure 5:
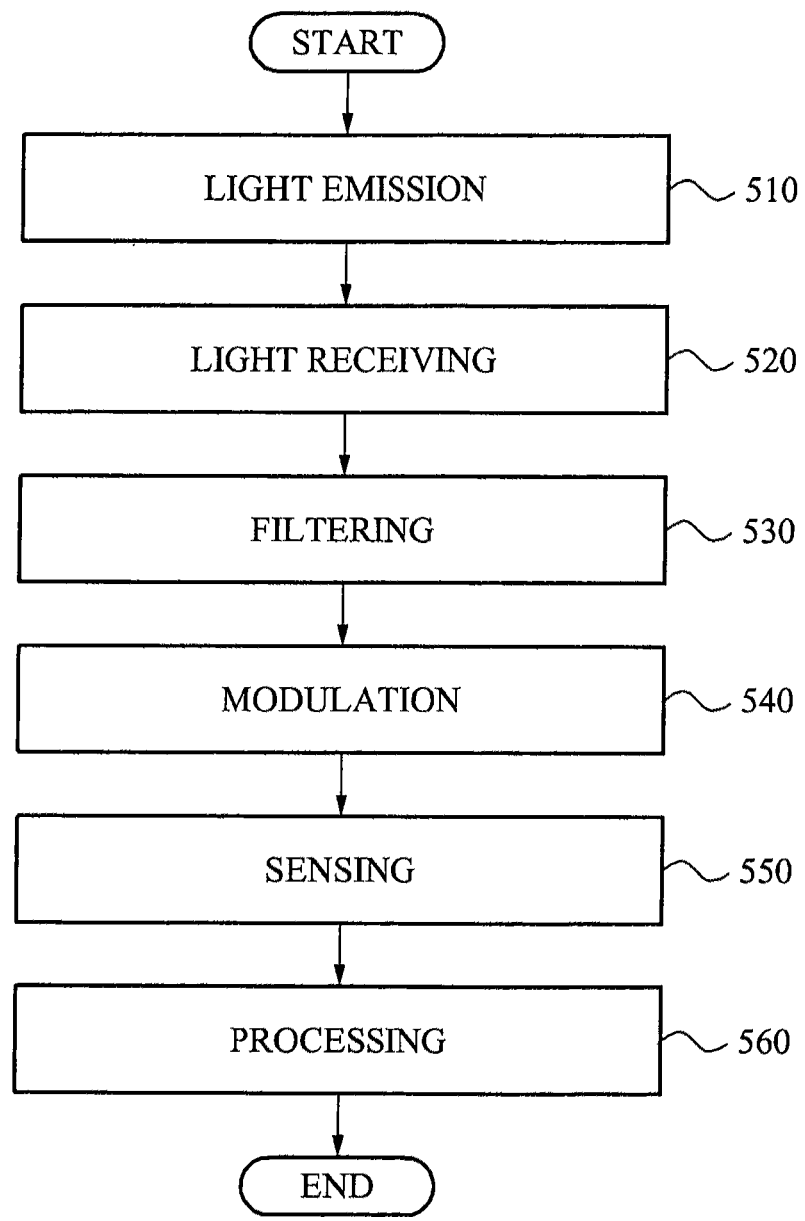
FIG. 5 illustrates a method of generating a depth image according to one or more embodiments.

FIG. 5 illustrates a method of generating a depth image according to one or more embodiments.

In operation 510, the light emitting unit 110 may emit, towards an object, an infrared light of a first wavelength band, for example, 1300 nm.

In operation 520, the light receiving unit 120 may receive a light reflected from the object. Here, the light receiving unit 120 may be, for example, a lens.

The light received by passing the light receiving unit 120 may include a light of all the bands including the infrared light of 1300 nm emitted from the light emitting unit 110 and the sunlight. Accordingly, in operation 530, the filtering unit 130 may band pass filter the light of all the bands and may transfer, to the modulation unit 140, only the infrared light of 1300 nm emitted from the light emitting unit 110.

In operation 540, the modulation unit 140 may modulate the filtered infrared light of 1300 nm to an infrared light of 800 nm in which a sensitivity of a silicon-based infrared sensing unit is relatively excellent.

In operation 550, the sensing unit 150 may convert, to an electrical signal, the infrared light of 800 nm entering each pixel of the sensing unit 150.

In operation 560, the processing unit 160 may generate a depth image corresponding to the object using the electrical signal, which is the same as the conventional depth camera.

The depth image generating method according to the above-described embodiments may be recorded in non-transitory computer-readable media including computer readable instructions to implement various operations by executing computer readable instructions to control one or more processors, which are part of a general purpose computer, a computing device, a compute system, or a network. The media may also have recorded thereon, alone or in combination with the computer readable instructions, data files, data structures, and the like. The computer readable instructions recorded on the media may be those specially designed and constructed for the purposes of the embodiments, or they may be of the kind well-known and available to those having skill in the computer software arts. The computer-readable media may also be embodied in at least one application specific integrated circuit (ASIC) or Field Programmable Gate Array (FPGA), which executes (processes like a processor) computer readable instructions. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of computer readable instructions include both machine code, such as produced by a compiler, and files containing higher level code that may be executed by the computer using an interpreter. The described hardware devices may be configured to act as one or more software modules in order to perform the operations of the above-described embodiments, or vice versa. Another example of media may also be a distributed network, so that the computer readable instructions are stored and executed in a distributed fashion.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for generating a depth image, comprising:
a light emitter configured to emit the infrared light of a first wavelength band towards an object;
a light receiver configured to receive a reflected infrared light from the object;
a filter configured to band pass filter an infrared light of the first wavelength band among the reflected infrared lights received from the object;
a modulator configured to modulate the filtered infrared light of the first wavelength band to an infrared light of a second wavelength band;
a sensor configured to generate an electrical signal by sensing the modulated infrared light of the second wavelength band; and
a processor configured to generate the depth image corresponding to the object using the electrical signal, wherein
the first wavelength band corresponds to a wavelength band including a radio wave received from sunlight to a surface of the Earth and having an infrared intensity less than or equal to a first threshold,
the second wavelength band corresponds to a wavelength band in which an efficiency of the sensor is greater than or equal to a third threshold,
the first wavelength band is substantially different from the second wavelength band,
the first wavelength band corresponds to a wavelength band comprising 1300 nanometers (nm) and having a bandwidth less than or equal to a second threshold, and
the second threshold is about 10 nm.

2. The apparatus of claim 1, wherein:
the sensor corresponds to a silicon based infrared sensor.

3. The apparatus of claim 1, wherein the second wavelength band corresponds to a wavelength band comprising 800 nm and having a bandwidth less than or equal to a fourth threshold.

4. A method of generating a depth image, comprising:
emitting, by a light emitter of a depth image generating apparatus, an infrared light of a first wavelength band towards an object;
receiving, by a light receiver of the depth image generating apparatus, a reflected infrared light from the object;
band pass filtering, by a filter of a depth image generating apparatus, an infrared light of the first wavelength band among the reflected infrared light received from the object;
modulating, by a modulator of the depth image generating apparatus, the filtered infrared light of the first wavelength band to an infrared light of a second wavelength band;
generating, by a sensor of the depth image generating apparatus, an electrical signal by sensing the modulated infrared light of the second wavelength band; and
generating, by a processor of the depth image generating apparatus, the depth image corresponding to the object using the electrical signal, wherein
the first wavelength band corresponds to a wavelength band including a radio wave received from sunlight to a surface of the Earth and having an infrared intensity less than or equal to a first threshold,
the second wavelength band corresponds to a wavelength band in which an efficiency of the sensor is greater than or equal to a third threshold,
the first wavelength band is substantially different from the second wavelength band,
the first wavelength band corresponds to a wavelength band comprising 1300 nanometers (nm) and having a bandwidth less than or equal to a second threshold, and
the second threshold is about 10 nm.

5. The method of claim 4, wherein:
the sensor corresponds to a silicon based infrared sensor.

6. The method of claim 4, wherein the second wavelength band corresponds to a wavelength band comprising 800 nm and having a bandwidth less than or equal to a fourth threshold.

7. At least one non-transitory computer-readable medium storing computer readable instructions to control at least one processor to implement the method of claim 4.

8. The apparatus of claim 1, wherein the second wavelength band corresponds to a wavelength band comprising 800 nm and having a bandwidth less than or equal to a fourth threshold, and
wherein the fourth threshold is about 10 nm.

9. The apparatus of claim 1, wherein the first threshold is 0.005 Watts per meter squared per nanometer ($W/m^2/nm$).

* * * * *